United States Patent

[11] 3,607,344

| [72] | Inventors | Michael F. Baumann<br>West Lawn;<br>Eugene H. Reich, Shillington; Charles E.<br>Coco, Shillington, all of Pa. |
|------|-----------|---|
| [21] | Appl. No. | 683,790 |
| [22] | Filed | Nov. 17, 1967 |
| [45] | Patented | Sept. 21, 1971 |
| [73] | Assignee | Wyomissing Corporation |

[54] FLUORESCENT COATINGS
8 Claims, No Drawings

[52] U.S. Cl. ........................................................ 117/33.5,
117/45, 117/72
[51] Int. Cl. ....................................................... B44d 5/06
[50] Field of Search ........................................... 117/33.5 T,
72, 45

[56] References Cited
UNITED STATES PATENTS

| 3,382,086 | 5/1968 | Singleton | 117/33.5 |
| 3,436,242 | 4/1969 | Schaffner | 117/33.5 |
| 3,458,506 | 7/1969 | Bloom et al. | 117/33.5 X |
| 3,459,744 | 8/1969 | Donlans et al. | 117/33.5 X |

OTHER REFERENCES

Heikkila, Application of Luminescent Pigments to Textiles, Rayon Text Mo., p. 477 9-1945

*Primary Examiner*—Alfred L. Leavitt
*Assistant Examiner*—Wayne F. Cyron
*Attorney*—Richard O. Church

ABSTRACT: Maximum effectiveness of fluorescent dyes in coatings is achieved by fusing or casting a fluorescent dye-impregnated resin into a continuous light-reflective and emissive film. Exceptionally pure colors are obtained due to the absence of any extraneous or different film-forming resins and high reflectivity is achieved due to the absence of discrete dye-impregnated resin particles that present irregular surfaces to cause a random scattering of incident light. In those instances where comparatively brittle resin systems are used to coat flexible substrates, special methods are provided for tightly adhering these resins to the substrate.

FLUORESCENT COATINGS

BACKGROUND OF THE INVENTION

1. Field of the Invention

This invention relates to coatings having daylight fluorescence. More particularly, this invention is related to methods and means whereby pure colored, high intensity daylight fluorescent coatings may be applied to substrates. The invention makes it possible to achieve both improved fluorescent glossy and matte coatings and also superior fluorescent process colors.

2. Description of the Prior Art

As has long been recognized, certain chemical systems may absorb energy in various forms and then lose such energy as by emitting electromagnetic radiation. Fluorescence may occur when the absorbed energy is emitted in the form of light.

Quite generally, this invention is concerned with various materials that will fluoresce by absorbing light at particular frequencies and reemit this absorbed energy at lower frequencies, and it particularly relates to those materials that will fluoresce in response to radiation in the ultraviolet and visible ranges. These materials are referred to herein as daylight fluorescent pigments or dyes. In these materials, the emitted light combines additively with the normal reflected color and tends to reinforce it to the extent that these materials appear to glow in normal daylight. This is due to the fact that the intensity of the color presented to the human eye not only contains the reflected (nonabsorbed) light, but also has a significant component due to the absorption of higher frequency electromagnetic energy by the material, such as ultraviolet, violet, blue and green, and the reemission of electromagnetic energy at a lower wave length closely identified with the wave length of the reflected light. By this means, a portion of the light that normally would be absorbed by the material is converted into the desired wave length or color to strengthen the intensity of the reflected light.

It can also be understood that by the use of fluorescent materials, it is not even necessary to have the frequency of the desired color in the incident light. For example, if a nonfluorescent orange-red color is illuminated with a light deficient in orange, reds or yellows, it will appear to be black or gray. On the other hand, if a fluorescent orange-red coating is utilized, it will not lose its color even when the incident light is deficient in red, orange and yellows, but only higher frequencies such as violet, blue and green. As previously mentioned, this is due to the phenomenon of fluorescence that enables the absorption of the shorter wave lengths and the reemission of longer wave lengths.

While the existence of fluorescent dyes such as the rhodamines, the napthalimides and the coumarins have long been known, it is only recently that methods have been found whereby they may be incorporated into coating materials to prepare fluorescent coatings. In early efforts to produce coatings having daylight fluorescence, the fluorescent dyes were simply dissolved in lacquers or shellacs. These dye solutions and spirit varnishes proved to be of little use since the coatings formed had practically no light fastness and very little daylight fluorescence.

It has since been found that suitable fluorescent pigments can be prepared by dissolving the fluorescent dye in a resinous matrix. While the selection of the particular resin system is of extreme importance in preventing loss of fluorescence and providing for color fastness, several resin systems, both thermosetting and thermoplastic, have proven effective. As a practical matter, however, most of the thermoplastic resin systems have not been commercially utilized to any extent due to the extreme difficulty encountered in trying to grind them into a fine powder suitable for dispersion in a liquid vehicle. Many of these thermoplastic resins are generally tough, elastic, or, even worse, some soften at grinding temperatures to form agglomerates. In any instance, from a standpoint of practical production, these thermoplastic resins have generally proven impractical for use as matrices for the fluorescent pigments.

One notable exception of a thermoplastic resin system that has proven useful is the sulfonamides. In the case of thermosetting materials the alcohol-modified urea formaldehydes are examples of effective resins. Both systems are desirable in that they are receptive to the fluorescent dyes, they do not interfere with the fluorescence of the dyes, and they provide a high degree of light fastness.

In formulating these thermosetting and thermoplastic resins impregnated with fluorescent dyes (hereinafter sometimes collectively referred to as pigments) to form a coating material, it is conventional to disperse the resin in a carrier liquid that is a nonsolvent for the pigment but is a solvent for a second film-forming resinous system. When this coating formulation is applied to a surface, the liquid vehicle dries and leaves a continuous film of the second resin system in which is held embedded discrete particles of the pigment. Due to the fact that the form of the individual resin particles is left undisturbed, this method is used to produce matte finishes.

Alternatively, when a glossy coating is desired, the pigment is first dissolved in a first solvent, and the film-forming resin is dissolved in a second solvent. When a film of this homogenous mixture is cast, the pigment precipitates during the solvent evaporation prior to the time the second solvent is completely evaporated. Since the pigment is precipitated in finer form and is more evenly distributed, a comparatively glossy coating is obtained. This dual solution method is necessarily limited for use with film-forming resins that are incompatible with the pigment resin and that have less affinity for the dye than the pigment resin. It also requires that faster evaporating solvents be used for the pigment resin than for the resin of the binder.

The above methods for applying fluorescent coatings may result either in a high gloss with low intensity colors or a matte finish with high intensity colors, but, heretofore, it has not been possible to obtain both a high gloss and high intensity colors in a single fluorescent coating. In the case of the glossy coatings, the use of the second solvent and resin system so dilutes the pigment that its full intensity color cannot be achieved. Matte coatings, on the other hand, preserve the color intensity, but they suffer from other defects. Since the matte coatings are applied as dispersions rather than solutions, the higher viscosity of the dispersions prevents obtaining a coating of uniform film thickness. As a result, fluorescent matte finishes have a characteristic mottled appearance.

From the foregoing it can be understood that both glossy and matte fluorescent coatings known to the prior art have certain deficiencies. It can be appreciated that at times it is desirable to prepare glossy fluorescent coatings having high intensity color and also, when desired, fluorescent matte coatings that are free from a mottled effect.

An example of one instance in which it is highly desirable to have glossy fluorescent coatings of high color intensity is process printing. As is known, this method for obtaining color reproduction makes use of a plurality of printing steps by which various colors are superimposed upon each other to obtain the desired color. Basically this involves separating the three primary colors of yellow, cyan and magenta of the original colored copy. These three colors, in appropriate percentages, are then applied separately to a substrate and their addition will reproduce any color in the visible spectrum. As can be understood, for this process to be effective, it is necessary that each coating layer be substantially transparent to permit the maximum transmission of light. For this reason, fluorescent coatings laid down from dispersions are unsatisfactory since the random orientation and irregular shape of the discrete resin particles causes unwanted scattering of light in its passage through the coating layers. To avoid this problem, process coatings are better applied from solution in a manner similar to glossy coatings. However, these suffer from the defects noted in respect to the glossy coatings in that they have less than optimum color intensity due to the presence of the securing binder resin which tends to dilute the pigment. While not always a serious problem, it can be understood that unless these process inks are carefully formulated, the binder resin may in itself contribute a slight color or opacity to the applied process coating.

SUMMARY OF THE INVENTION

Accordingly, it is an object of this invention to provide fluorescent coatings that have optimum color intensity.

Another object of this invention is to prepare coatings that are vividly fluorescent.

A further object of this invention is to provide fluorescent coatings that are glossy and have optimum color intensity.

Still a further object of this invention is to prepare fluorescent coatings, particularly matte-finished coatings, that are substantially free from mottling.

A further object of this invention is to provide a method whereby fluorescent matte coatings may be prepared having an improved balance of color intensity and weight of pigments.

Yet another object of this invention is to prepare fluorescent coatings and coating compositions that may be used in process printing without substantial diminution of the vividness of the various colors.

And yet a further object of this invention is to provide maximum intensity fluorescent coatings for flexible substrates, which coatings are tightly bound to the substrate and will not tend to abrade or break off when the substrate is flexed or otherwise abused.

Briefly, these and other objects of this invention are obtained by fusing or casting fluorescent dye-impregnated resin particles into a continuous light-reflective and light-emissive film. In those instances in which the resinous film is not sufficiently tough and flexible for use with flexible substrates, the film may be bound to the substrate variously by enclosing the resinous film in a sandwich between the substrate and a clear transparent top protective layer or by first coating the substrate with an adhesive coating. In either instance the intensity of the fluorescent colors will be at optimum levels since the pigment will be in the form of a continuous, undiluted and uncontaminated film of solid color. It is also within the scope of this invention, when maximum adhesion is required, to include a softening agent to help bond the resin to the coating.

From the foregoing description of the prior art processes for preparing both matte and glossy finishes, it can be understood that it has been assumed that in order to obtain maximum properties, both physical and visual, of fluorescent coatings, that the fluorescent pigments must be held as individual particles in a film-forming matrix. It has now been discovered that this is not always necessary and further, that it often may be undesirable. For example, to obtain maximum visual properties of a pigment, the ratio of the fluorescent dye to the resin matrix is rather critical. On the one hand the color strength will be intensified with increasing amounts of dye but, on the other hand, light fastness and general susceptibility to degradation are adversely affected as the dye to resin ratio is increased. For this reason, in formulating fluorescent dyes having optimum properties, the selection of a particular dye to resin ratio becomes somewhat critical. However, after this critical ratio has been determined and the pigment properly formulated, a coating composition comprised of either the foregoing solvent or dispersion system is prepared that dilutes the concentration of the pigment by adding a foreign resin system and so upsets the nice balance between the resin and the dye so carefully selected by the pigment manufacture to obtain optimum conditions. It will at once be apparent, in the practice of this invention, that such dilutions of the pigments is avoided since a continuous, undiluted and uncontaminated uniform layer of pigment will be laid down having the maximum color intensity that it is possible to obtain.

A further advantage that accrues in the practice of this invention lies in the fact a wider selection of resins is made available to form the matrix for the fluorescent dyes. Since the fluorescent coatings of this invention are to be cast or fused into a continuous film from a solution of the pigment and an appropriate solvent, the requirement for selecting a friable resin that may conveniently be subdivided into a finely divided pigment is removed. Essentially, therefore, any suitable resin may be used so long as it may be dissolved in a practical solvent.

As mentioned above, some of the desirable resin systems are somewhat friable and thus will tend to crack or break loose from a flexible substrate when it is twisted or bent.

Still a further advantage accrues in the practice of this invention when utilized in connection with process printing techniques. Due to the extreme purity of the fluorescent color layers that may be laid down, the resulting printed colors are characterized by vivid fluorescence, and exceptionally strong, clean colors.

And still a further benefit is obtained in the practice of this invention when used in connection with laying down matte finishes. While it is true that the undiluted continuous film of pigment made in accordance with this invention is an exceptionally glossy coating, it may, nonetheless, be advantageously used when preparing matte coatings to avoid the characteristic mottled appearance of these matte coatings. In order to achieve this result, a comparatively thin continuous film of fluorescent pigment is laid down to provide a glossy coating. A matte finish is then applied in a conventional manner by the use of a pigment dispersion and due to the random orientation of the irregularly shaped pigment particles in the dispersion layer, incident light will be scattered when it impinges upon the upper layer and thus yield a matte coating. However, due to the existence of the continuous glossy fluorescent undercoat, it becomes almost impossible, by means of the human eye, to discern any irregularities in the distribution of the pigment dispersion in the upper layer.

In the following examples, all parts given are by weight, and a ream of paper is defined to be 500 sheets, 25 inches by 38 inches.

EXAMPLE I

A fluorescent coating material was made by forming a solution of 50 parts resin, one-half part fluorescent dye, and 50 parts solvent. The resin was formed by condensation of aryl sulfonamides with formaldehyde and was obtained from the Monsanto Company under the trade designation "Santolite MPH." This is a particularly useful resin since it is thermoplastic, straight-chained, and of good flexibility. The dye used was rhodamine B sold by American Cyanamid. The solvent was methyl ethyl ketone.

The above coating was then applied to a continuous web of paper by a gravure process by applying 3 to 6 pounds of the solution per ream of paper. The coating as so applied had very high gloss and extremely high color intensity. Due to the flexibility of the resin, the coating adhered well to the paper even when it was flexed, and the coating did not tend to crack or abrade from the surface of the paper.

EXAMPLE II

The procedure of Example I was repeated, except that the resin formed by condensation of aryl sulfonamides with formaldehyde was sold by the Monsanto Company under the trade designation "MS–80." Similar results were obtained.

EXAMPLE III

Example I was repeated; however, the resin was selected to be a urea formaldehyde sold under the trade designation "Beetle 227–8" by American Cyanamide. This experiment was also successful; however, it was noted that the flexibility of the resin was not as great and, accordingly, there was some tendency for the coating to crack and break away from the flexible paper substrate.

EXAMPLE IV

A 50 percent solution of methyl ethyl ketone and a commercially available fluorescent pigment was prepared. The commercial pigment was fluorescent lemon yellow in a modified sulfonamide matrix sold by Lawter Chemicals under the trade designation "Hi-Viz B–3539." This was applied directly to a continuous paper web in amount of 3 to 6 pounds per ream. Note that this differs from conventional practice in that no foreign binder resin was used.

The applied coating dried to a continuous film that was vividly fluorescent with extremely high color strength. However, due to the friable nature of the particular sulfonamide matrix, it is not entirely satisfactory for use on a flexible substrate such as paper since it may break and flake away from the paper. However, if the coating is applied to a comparatively rigid substrate that will not be subject to undue abuse, it might prove satisfactory in this form.

EXAMPLE V

In order to obtain greater adhesion of the brittle coating prepared in Example IV so that the fluorescent coating would be satisfactory for use with a flexible substrate such as paper, a primer coat, herein sometimes referred to as a tie coat, was first applied to the paper web. This tie coat was comprised of a 25 percent solution of an acrylic resin in toluene. The acrylic resin was obtained from Rohm & Haas under the trade designation "Acryloid B-44." This solution was applied to a paper web in an amount equal to 3 pounds per ream. After the tie coat was dry, a fluorescent coating was applied in accordance with Example IV and the coated paper was then heated for a brief period of time to 250° F. to improve the interface adhesion between the tie coat and the fluorescent coating. It was found that when the paper so coated was flexed, excellent adhesion had been obtained between the fluorescent coating and the tie coat, and, as a result, little cracking or other deterioration of the coating layer was observed. Most importantly, however, the use of the tie coat in no manner caused any diminution in the vividness of the fluorescent coating nor in the strength of the color.

EXAMPLE VI

The procedures of Example V were duplicated utilizing other tie coating systems. Representative of other tie coating systems that proved equally effective are those comprised of vinyl-toluene copolymers such as "Marbon 1100 TMW" as sold by Marbon Chemical, and "Keltrols 1047" as sold by Spencer-Kellogg; a latex sold by Firestone under the trade designation "FR-S176"; and an acrylic latex sold under the trade designation "B-15." Additional suitable tie coat systems will readily suggest themselves to those skilled in the art. Also, when desired, fillers such as clay and other extending materials may be incorporated in the tie coating system.

EXAMPLE VII

A coating was prepared in accordance with Example IV, and in this instance, adhesion to the paper substrate was obtained by utilizing an overlacquer that serves to protect the resin film and sandwich it between the substrate and the protective film. The use in formulation of these overlacquers is quite common and well known in the art. Their only special requirement for this particular application is that their solvent base must not dissolve the fluorescent resins, for if it did so, the fluorescent layer would be destroyed as by lifting it away from the substrate, causing "orange peel" and the like. Also, in formulating the overlacquer, consideration may be given to other desirable surface properties of the coated substrate. For example, the overlacquer may be formulated to provide maximum abrasive resistance, to enable heat sealing of the substrate, or to improve the printing characteristics of the overlacquer. In this particular example, the overlacquer used was a 40 percent solution of a clear acrylic resin in toluene. The acrylic was obtained from Rohm & Haas under the trade designation "B-66." After this overlacquer had been dried, it was found that the fluorescent layer was well protected, and when the paper was flexed or bent, it did not display tendencies to crack or break away from the paper substrate. Additionally, the vividness of the fluorescent coating was undiminished as was the high intensity of the color strength.

Examples of other solvents which may be used that will not attack the sulfonamide and aldehyde type resins of the pigment are alcohol and aliphatic and aromatic hydrocarbons. Other typical resins that may be used successfully as overlacquers include such materials as alkyds, alkyd-modified polyesters, polyesters, U.F. resins and the like.

EXAMPLE VIII

As mentioned above, it has been found that adhesion can be somewhat enhanced by softening the resin matrix of the pigment. By so doing, the resin is rendered somewhat tacky and is given greater mobility to help bond the pigment to the substrate. Quite generally, plasticizers for the pigment are suitable for softening the plastic in order to promote adhesion. However, as discussed above, these softening agents will, to some extent, dilute or contaminate the pigment, and thus, to some extent, will cause a slight loss in the intensity of the color. For this reason, these softening agents are used only when adequate adhesion otherwise cannot be obtained. Also, of course, it is understood that they can be used alone or in conjunction with the above-described tie coats and overlacquers.

In this example, a solution was prepared utilizing 45 parts fluorescent lemon yellow pigment (Lawter Hi-Viz B3539), 47½ parts methyl ethyl ketone, and 7½ parts of a plasticizer of an alkyd resin derived from turpene polybasic acids sold by Hercules Powder Company under the trade designation "Petrex 7-75T." This solution was applied to a paper web in an amount equal to about 3 to 6 pounds per ream. After the coating had dried, it was found to be tightly adherent to the paper web and, when the paper was flexed or bent, the coating did not tend to crack away. The coating was glossy and vividly fluorescent; however, some loss in color intensity was noted as compared with the coatings prepared, for example, in Example IV.

Other plasticizers that may be used to soften the modified sulfonamide matrix include resins formed by the condensation of aryl sulfonamides with formaldehyde as sold by Monsanto Company under the trade designations "Santolite MS-80" and "Santolite MPH"; ortho and para toluene sulfonamides sold under the trade designation "Santicizer 8" by the Monsanto Company; rosin alkyds sold by Hercules Powder under the trade designation "Neolyn 35-75T"; and a hydroabietyl alcohol-derived alkyd sold by Hercules Powder under the trade designation "Cellolyn 95-80T."

EXAMPLE IX 18 parts of a fluorescent pigment having a modified sulfonamide matrix was dispersed in a solution of 12 parts acrylic resin and 58 parts solvent. In this example, the pigment was a fluorescent red-orange sold under the trade designation "B-3513" by Lawter Chemicals, the acrylic resin was obtained from Rohm & Haas under the trade designation "Acryloid B-91," and the solvent was VM&P naptha. This dispersion was then laid onto a paper substrate in an amount equal to about 10 pounds per ream. After the coating had dried, it was found to have the desired low gloss and high color intensity, but an observable mottled effect could be seen by the unaided human eye. As discussed above, this mottled effect is due, at least in part, to the difficulty in obtaining a perfectly uniform film thickness when working with dispersions as opposed to solutions.

EXAMPLE X

To illustrate the utility of preparing matte coatings free from a mottled effect by first applying a fluorescent glossy layer in accordance with this invention, the following test was performed. A solution was prepared comprised of 45.5 parts fluorescent red-orange pigment and 50 parts methyl ethyl ketone. This solution was laid down on a paper substrate in an amount equal to about 3 pounds per ream. After this glossy coating had been dried, a second and third coating of the matte coating material of Example IX were applied having a total weight of about 3 pounds per ream. Accordingly, the total weight of dried coating applied to the paper was only 6 pounds per ream. Even though this weight was considerably less than the total weight applied in Example IX, it was found to have equal color brilliance. Additionally, the matte finish was preserved, that is, it did not become glossy, and no mottling could be detected by the unaided human eye.

Although certain embodiments of this invention have been described in the specification, it is to be understood that the invention is not limited thereto, is capable of modification, and can be rearranged without departing from the spirit and scope of the invention.

We claim:

1. A flexible substrate having a reflective and light-emissive coating adhered to its surface characterized in that the light-reflective and emissive coating consists essentially of a pigment in the form of continuous film, the pigment consists of a resin impregnated with a fluorescent dye, and the resin is selected to be receptive to the fluorescent dyes, not to interfere with the fluorescence of the dyes, and to provide a high degree of light fastness.

2. A flexible substrate according to claim 1, wherein the resin is selected from the class consisting of modified sulfonamides and alcohol modified urea formaldehydes.

3. A flexible substrate according to claim 1, wherein a second coating layer is applied over the continuous film, which second layer consists essentially of a dispersion of discrete particles of the fluorescent pigment held in transparent resinous matrix.

4. A flexible substrate according to claim 1, wherein a tie coat is applied to the substrate to improve the adhesion of the light reflective and emissive coating, the tie coat being selected from the class consisting of acrylic resins, vinyltoluylene copolymers, and latexs.

5. A flexible substrate according to claim 1, wherein the light reflective and emissive coating is overprinted with a similar coating layer having different color values than the base coating in order to form process colors.

6. A method for applying a glossy, vivid fluorescent coating which comprises dissolving a pigment in a solvent, applying the solution to a flexible substrate, and evaporating the solvent to form a continuous film of pigment characterized in that the pigment consists essentially of a resin impregnated with a fluorescent dye and the resin is selected from those that are receptive to the fluorescent dyes, do not interfere with the fluorescent of the dye, and provide a high degree of light fastness.

7. A method for forming a vivid, fluorescent matte finish coating on a flexible substrate comprising the step of applying to the surface of the coating of claim 5, a second coating layer consisting essentially of a dispersion of discrete particles of the fluorescent pigment.

8. A method for forming vivid, fluorescent coatings of process colors which comprises the step of overprinting the coating of claim 5, with a second similar coating that has a different color value than does the base coating.